Patented Aug. 7, 1951

2,563,774

UNITED STATES PATENT OFFICE 2,563,774

ABRASIVE MIX

Lawrence M. Debing, Springfield, Mass., assignor to Monsanto Chemical Company, St. Louis, Mo., a corporation of Delaware No Drawing. Application April 16, 1948, Serial No. 21,551

5 Claims. (Cl. 51—298)

This application relates to the manufacture of abrasive articles.

One method which has been used for the manufacture of grinding wheels and other abrasive articles bonded with thermosetting synthetic resins is to wet the abrasive grits with a small amount of a liquid agent such as liquid phenolic resin, furfural, cresylic acid, etc. and then mix therewith powdered thermosetting resin and a mineral filler. The resulting abrasive mix is initially a free-flowing material, but on standing for relatively short periods of time, the coated grains tend to cohere and thereby cause the mix to lose its free-flowing characteristics.

It is an object of this invention to provide abrasive mixes with improved free-flowing properties. A particular object of this invention is to provide abrasive mixes which retain their free-flowing characteristics for relatively long periods of time.

These and other objects are accomplished according to this invention by incorporating a small amount of silica aerogel in the abrasive mix. By preparing the mixes in this manner, it has been unexpectedly discovered that the resulting mixes may be allowed to stand for relatively long periods of time without losing their free-flowing characteristics.

The following examples are illustrative of the present invention, but are not to be construed as limitative thereof.

Example I 42 parts of a liquid "A" stage, thermosetting, phenol-formaldehyde resin are thoroughly mixed with 1280 parts of No. 16 aluminum oxide abrasive grits. To the resulting wetted grits are then added 106 parts of a finely divided, solid, potentially reactive phenol-formaldehyde bonding agent, together with 61 parts of cryolite filler, in a tumbling apparatus. The resulting mixture is tumbled for several minutes and then 3 parts of silica aerogel are added and the tumbling continued for a short time to disperse the aerogel therein.

The resulting abrasive mix may be allowed to stand for several days without caking, i. e., it retains its free-flowing characteristics. In contrast thereto, an otherwise identical mix which does not contain the silica aerogel is found to be badly caked in 30 to 60 minutes.

Example II

Example I is repeated except that the silica gel is incorporated with the powdered bonding agent prior to admixture with the wetted grits. The resulting abrasive mix is found to have free-flowing characteristics generally similar to those of the product in Example I. However, it is found that somewhat less of the powdered bonding agent is picked up on the wetted grits.

Example III

Example I is repeated, except that 1 part of the silica aerogel is used instead of 3 parts. The product is similar to the product of Example I except that there is some tendency for the abrasive mix to lose its free-flowing characteristics, particularly at the bottom of large masses of the mix after storage for some time.

Example IV

Example I is repeated except that 2 parts of the silica aerogel are used instead of 3 parts. The product is generally similar to the product of Example I as regards free-flowing characteristics.

The abrasive mixes of Examples I, II, III and IV may be further processed in the usual manner to form finished abrasive articles, such as grinding wheels. Thus, these mixes may be molded to shape and then baked to cause the bonding agent to thermoset. The heat-hardened products are found to possess the usual characteristics of abrasive articles which do not contain silica aerogel.

Numerous modifications may be introduced into the process of manufacturing the abrasive mixes of the invention as illustrated by the examples.

Thus, the relative ratios of grits, liquid agent, bonding agent, fillers, etc., may be varied in accordance with the usual practice in the art to achieve the type of abrasive article desired. The amount of silica aerogel may be subjected to substantial variation in order to give the desired free-flowing characteristics. The optimum amount for any given mix may vary to some extent, depending upon the nature and amount of the components thereof. Usually, it is found that 1–25 parts and, especially, 2–10 parts of silica aerogel for every 100 parts of the liquid agent are sufficient to overcome the tendency of the abrasive mixes to cohere on standing. Larger amounts may be used, but there may not be any particular advantage in so doing.

Various types of grits may be used which are well known to those skilled in the art, such as silicon carbide, emery, garnets, flint, corondum, aluminum oxide and the like. The coarseness of the grits may also be varied in accordance with the usual practice in order to achieve specific types of abrasive articles.

In place of liquid phenol-aldehyde condensation products, other liquid agents well known to those skilled in the art may be employed, such as furfural, cresylic acid, liquid furfuryl alcohol polymers, liquid phenol-furfural resins, liquid urea-aldehyde condensation products, liquid melamine-aldehyde condensation products, liquid thiourea-aldehyde condensation products, etc. These agents have the characteristic of "picking up" the solid bonding agent and thus facilitating uniform distribution of bonding agent in the mix. Usually the property of "picking up" the solid bonding agent is due at least in part, to a solvent action of the bonding agent for the solid resin.

In place of phenol-formaldehyde resin as the bonding agent, other thermosetting or potentially reactive resins may be used, such as aminotriazine-aldehyde resins, specifically melamine-formaldehyde resins, ammeline-formaldehyde resins, urea-aldehyde resins, thiourea-aldehyde resins, dicyandiamide-aldehyde resins, phenol-furfural resins, as well as others well known to those skilled in the art.

The silica aerogel is a low density, finely divided, porous, white powder. It may be prepared from silica aquagels and silica organosols by a unique process which permits drying of the gel without shrinkage of the solid structure. This unique method comprises drying a silica gel at a pressure above the critical pressure of the solvent in the gel. Under these conditions, no shrinkage of the gel occurs and the final product consists essentially of the skeleton of the colloid as it existed in the original undried gel. The method of drying the silica gels may also be said to be a method for replacing the liquid in the gel with air without altering the physical shape of the silica. The aerogels and methods for making them are more fully described in U. S. Patent 2,093,454 to Samuel S. Kistler.

The silica aerogel used in the examples is the type sold on the market under the designation Santocel C and is characterized by a particle size of 3-5 microns diameter. Other silica aerogels may be used such as Santocel CR which has the same particle size as Santocel C, but is compressed to reduce its bulk, for convenience in handling. Santocel CF, which has a somewhat larger particle size, may also be used, although somewhat larger amounts may be required to achieve the same free-flowing characteristics. While substantial variation in particle size is permissible, in general, it is preferred that the majority of the particles have a diameter of not over 1000 microns. According to a preferred embodiment of the invention, the majority of the particles have a diameter of not over 100 microns.

Numerous variations apparent to those skilled in the art may be introduced into the compounding of the abrasive mixes of the invention. Thus, the duration of the mixing operations and the type of mixing apparatus may vary, depending on the specific nature and amounts of the components as well as the results desired. However, it is necessary that the addition of the silica aerogel does not precede the addition of the solid bonding agent, i. e., the silica aerogel may be added simultaneously with or subsequent to the addition of the bonding agent. According to a preferred embodiment of the invention, the addition of the silica gel is delayed until after the bonding agent is incorporated with the wetted grits.

Various fillers may be used in accordance with the usual practice, such as graphite, cryolite, glass, flint; organic fillers, such as shellac, rosin, cellulose acetate, natural and synthetic resins, etc.

More or less of the silica aerogel may be replaced by such materials as acetylene black, clays, such as talc, diatomaceous earth, bentonites, etc.

It is obvious that many variations may be made in the products and processes of this invention without departing from the spirit and scope thereof as defined in the appended claims.

What is claimed is:

1. In a process for preparing an abrasive mixture the steps which consist essentially of wetting the abrasive grains with a liquid agent taken from the group consisting of liquid phenol-aldehyde condensation products, liquid phenol-furfural condensation products, liquid urea-aldehyde condensation products, liquid melamine-aldehyde condensation products, liquid thiourea-aldehyde condensation products, furfural, cresylic acid and liquid furfuryl alcohol polymers and then mixing the product with a finely-divided, solid, potentially reactive resin taken from the group consisting of phenol-formaldehyde condensation products, melamine-formaldehyde condensation products, ammeline - formaldehyde condensation products, urea-formaldehyde condensation products, dicyandiamide - formaldehyde condensation products and phenol-furfural condensation products and silica aerogel thereby enhancing the free-flowing qualities of the abrasive mixture said silica aerogel being present in amounts ranging from 2 to 10 parts by weight per 100 parts of liquid agent.

2. A process as defined in claim 1 wherein both the liquid agent and the potentially reactive resin are phenol-formaldehyde condensation products.

3. A process as in claim 2 wherein the silica aerogel is incorporated into the mixture subsequent to the addition of the solid resin.

4. A moldable, heat-hardenable abrasive mixture having improved free-flowing characteristics which consists essentially of abrasive granules wetted with a liquid agent taken from the group consisting of liquid phenol-aldehyde condensation products, liquid phenol-furfural condensation products, liquid urea-aldehyde condensation products, liquid melamine-aldehyde condensation products, liquid thiourea-aldehyde condensation products, furfural, cresylic acid and liquid furfuryl alcohol polymers, a finely-divided, solid, potentially reactive resinous bonding agent taken from the group consisting of phenol - formaldehyde condensation products, melamine formaldehyde condensation products, ammeline-formaldehyde condensation products, urea-formaldehyde condensation products, thiourea-formaldehyde condensation products, dicyandiamide-formaldehyde condensation products and phenol-furfural condensation products and, as an anti-caking agent, silica aerogel said silica aerogel being present in amounts ranging from 2 to 10 parts by weight per 100 parts of liquid agent.

5. An abrasive mixture as in claim 4 wherein both the liquid agent and the resinous bonding agent are phenol-formaldehyde condensation products.

LAWRENCE M. DEBING.

REFERENCES CITED

The following references are of record in the file of this patent:

UNITED STATES PATENTS

| Number | Name | Date |
| --- | --- | --- |
| 2,076,517 | Robie | Apr. 6, 1937 |
| 2,093,454 | Kistler | Sept. 21, 1937 |
| 2,249,278 | Kistler | July 15, 1941 |
| 2,257,545 | Curtis | Sept. 30, 1941 |
| 2,440,300 | Rushmer et al. | Apr. 27, 1948 |

FOREIGN PATENTS

| Number | Country | Date |
| --- | --- | --- |
| 461,437 | Great Britain | Feb. 16, 1937 |